(12) United States Patent
Ross

(10) Patent No.: US 10,549,407 B2
(45) Date of Patent: Feb. 4, 2020

(54) RATCHET MECHANISM SPRING

(71) Applicant: Snap-on Incorporated, Kenosha, WI (US)

(72) Inventor: David T. Ross, Beach Park, IL (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 15/803,052

(22) Filed: Nov. 3, 2017

(65) Prior Publication Data

US 2018/0050438 A1  Feb. 22, 2018

Related U.S. Application Data

(63) Continuation of application No. 14/919,012, filed on Oct. 21, 2015, now Pat. No. 9,844,860.

(60) Provisional application No. 62/080,547, filed on Nov. 17, 2014.

(51) Int. Cl.
*B25B 13/46* (2006.01)
*F16H 31/00* (2006.01)
*F16F 1/26* (2006.01)

(52) U.S. Cl.
CPC ......... *B25B 13/463* (2013.01); *F16H 31/005* (2013.01); *F16F 1/26* (2013.01)

(58) Field of Classification Search
CPC . B25B 13/463; F16F 1/027; F16F 1/18; F16F 1/26; F16H 31/002; F16H 31/005
See application file for complete search history.

(56) References Cited

U.S. PATENT DOCUMENTS

| | | | |
|---|---|---|---|
| 754,012 A | 3/1904 | Reams | |
| 2,676,404 A | 4/1954 | Peckron et al. | |
| 4,319,100 A * | 3/1982 | Tallody | H01H 15/102 200/16 D |
| 5,157,994 A | 10/1992 | Krivec | |
| 5,948,406 A | 9/1999 | Stavinski et al. | |
| 6,820,520 B2 | 11/2004 | Chen | |
| 7,044,029 B1 | 5/2006 | Hopper, Jr. et al. | |
| 7,444,903 B1 | 11/2008 | Li | |
| 8,261,635 B2 | 9/2012 | Lee et al. | |
| 9,073,184 B2 | 7/2015 | Chen et al. | |

(Continued)

FOREIGN PATENT DOCUMENTS

CN 2936587 8/2007
CN 104117950 10/2014

(Continued)

OTHER PUBLICATIONS

Australian Patent Examination Report No. 1 for Application No. 2017201490, dated Oct. 27, 2017, 3 pages.

(Continued)

*Primary Examiner* — Thomas C Diaz
(74) *Attorney, Agent, or Firm* — Seyfarth Shaw LLP

(57) ABSTRACT

A spring component for a ratcheting mechanism, such as a ratchet wrench. The spring component is shaped to be retained in a recess without any special machining. For example, the spring component can be retained at three abutment points. A leaf of the spring component can abut a pawl, and a base portion opposite the leaf can abut the drive gear. Support arms can abut the sidewall of the recess to retain the spring component within the recess without the need for special machining or tooling.

6 Claims, 3 Drawing Sheets

(56) References Cited

U.S. PATENT DOCUMENTS

2003/0213342 A1   11/2003  Wu
2006/0027049 A1    2/2006  Arnold
2008/0006124 A1    1/2008  Weng
2014/0196576 A1    7/2014  Chen et al.

FOREIGN PATENT DOCUMENTS

| | | | | |
|---|---|---|---|---|
| DE | 3322967 | | 1/1985 | |
| FR | 369573 | A | 12/1950 | |
| FR | 969573 | A * | 12/1950 | ............ F16D 41/12 |
| TW | 310561 | | 7/1997 | |
| TW | 519016 | | 1/2003 | |
| TW | 547260 | | 8/2003 | |
| TW | M369827 | | 12/2009 | |
| TW | M452875 | | 5/2013 | |
| TW | M454901 | | 6/2013 | |

OTHER PUBLICATIONS

Chinese Office Action for Application No. 201510788064.7, dated Jul. 20, 2017, 7 pages.
Canadian Examiner's Report No. 2 for Application No. 2,911,727, dated Oct. 14, 2016, 5 pages.
Australian Patent Examination Report No. 2 for Application No. 2015252155, dated Jul. 7, 2016, 5 pages.
United Kingdom Intellectual Property Office, Combined Search and Examination Report for Application No. GB1520186.6, dated May 17, 2016, 6 pages.
Australian Patent Examination Report No. 1 for Application No. 2015252155, dated Mar. 3, 2016, 6 pages.
Australian Patent Examination Report No. 2 for Application No. 2017201490, dated Sep. 26, 2018, 4 pages.

* cited by examiner

RATCHET MECHANISM SPRING

CROSS-REFERENCE TO RELATED APPLICATIONS

The present application is a continuation of and claims the benefit of U.S. patent application Ser. No. 14/919,012, filed Oct. 21, 2015, entitled Ratchet Mechanism Spring, which claims priority to U.S. Provisional Patent Application No. 62/080,547, filed Nov. 17, 2014, the contents of which are incorporated by reference herein in their entirety.

TECHNICAL FIELD OF THE INVENTION

The present invention relates generally to ratchet mechanisms and, in particular, to springs for retaining pawls of the ratchet mechanisms.

BACKGROUND OF THE INVENTION

Currently, many ratchet mechanisms are known and used. Typically, these mechanisms are incorporated into hand tools, such as wrenches or screwdrivers. Such tools allow for a drive portion to be engageable with, for example, a bolt head. In general, the ratchet mechanism includes a drive direction for use in applying torque to a fastener. Additionally, the ratchet mechanism typically allows for slipping or ratcheting when rotated in a direction opposite the drive direction.

In conventional ratchet mechanisms, such as in ratchet wrenches, a spring mechanism typically biases a pawl into engagement with a drive gear to allow the ratchet mechanism to apply torque in the drive portion, while also allowing for slipping or ratcheting when rotated in the opposite direction. However, such spring mechanisms tend to be composed of multiple parts and may require machining to enable the correct placement and operation of the ratchet wrench. For example, many conventional ratchet mechanisms include a hoop spring that extends around a periphery of the drive gear and couples with the pawl in a pawl pocket. The hoop spring requires a circumferential groove to be formed in the interior of the wrench head, increasing costs and the complexity of the wrench.

SUMMARY OF THE INVENTION

The present invention broadly comprises a spring component for biasing a pawl against a drive gear in a ratchet mechanism. For example, the spring component is shaped to be retained in a recess within a head of a ratcheting mechanism tool, such as a ratchet wrench, and biases the pawl towards the drive gear, without any special machining or additional components. The spring component can include a leaf that applies a bias force against the pawl, and a base portion opposite the leaf that abuts or contacts the drive gear. Another portion of the spring component can abut the sidewall of the recess to retain the spring component within the recess without the need for special machining or tooling.

In an embodiment, the present invention broadly comprises a spring component including a base portion, a leaf opposite the base portion and adapted to contact a pawl, and a support arm extending from the base portion and adapted to abut a wall of a recess to retain the spring portion within the recess.

In another embodiment, the present invention broadly comprises a tool including a drive gear, a pawl adapted to be coupled to the drive gear and engage the drive gear to allow rotation of the drive gear in a drive direction, and disengage and slip against the drive gear in a ratcheting direction opposite the drive direction, a head having a recess formed therein, the recess including a wall, and a spring component. The sprint component can include a base portion, a leaf opposite the base portion and adapted to abut the pawl, and a support arm extending from the base portion and adapted to abut the wall.

In another embodiment, the present invention broadly comprises a spring component for a ratchet mechanism including a base portion, a leaf extending from the base portion in a first direction and in a same plane as the base portion, the leaf adapted to bias a pawl of the ratchet mechanism into engagement with a drive gear of the ratchet mechanism, a first support arm extending from a first side of the base portion and in a second direction substantially perpendicular to the plane of the base portion, and a second support arm extending from a second side of the base portion opposite the first side, and in the second direction. The first and second support arms are adapted to position the spring component in a recess of the ratchet wrench to allow the ratchet wrench to apply torque when rotated in a drive direction and slip against the drive gear when rotated in a ratcheting direction opposite the drive direction.

BRIEF DESCRIPTION OF THE DRAWINGS

For the purpose of facilitating an understanding of the subject matter sought to be protected, there are illustrated in the accompanying drawings embodiments thereof, including a preferred embodiment, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
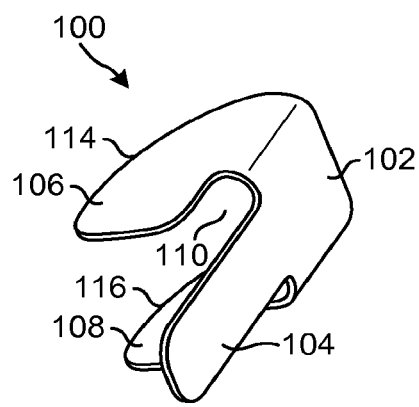
FIG. 1 is a top perspective view of a spring component of a ratchet mechanism according to an embodiment of the present invention.

While this invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a spring component for a ratcheting mechanism, such as found in a ratchet wrench. For example, the spring component is shaped to be independently retained in a recess without any special machining. The spring component can include a leaf at a first side and a base portion at a second side opposite the first side. The leaf applies a bias force against the pawl, and the base portion abuts the drive gear in a passive manner to retain the spring component against the drive gear without substantially affecting the rotation of the drive gear. Another portion of the spring component can abut a sidewall of the recess to retain the spring component within the recess without the need for special machining or tooling.

Figure 2:
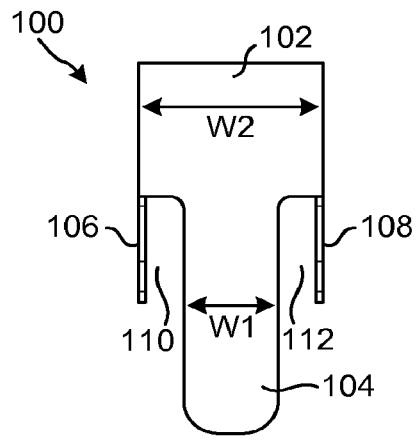
FIG. 2 is a top plan view of the spring component of FIG. 1.
Figure 3:
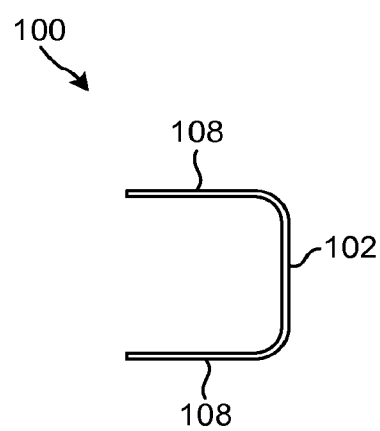
FIG. 3 is a rear elevation view of the spring component of FIG. 1.
Figure 4:
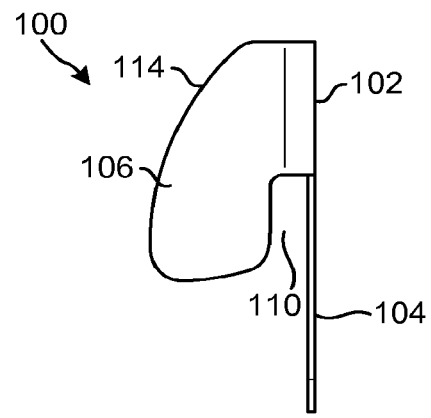
FIG. 4 is a side elevation view of the spring component of FIG. 1.
Figure 6:
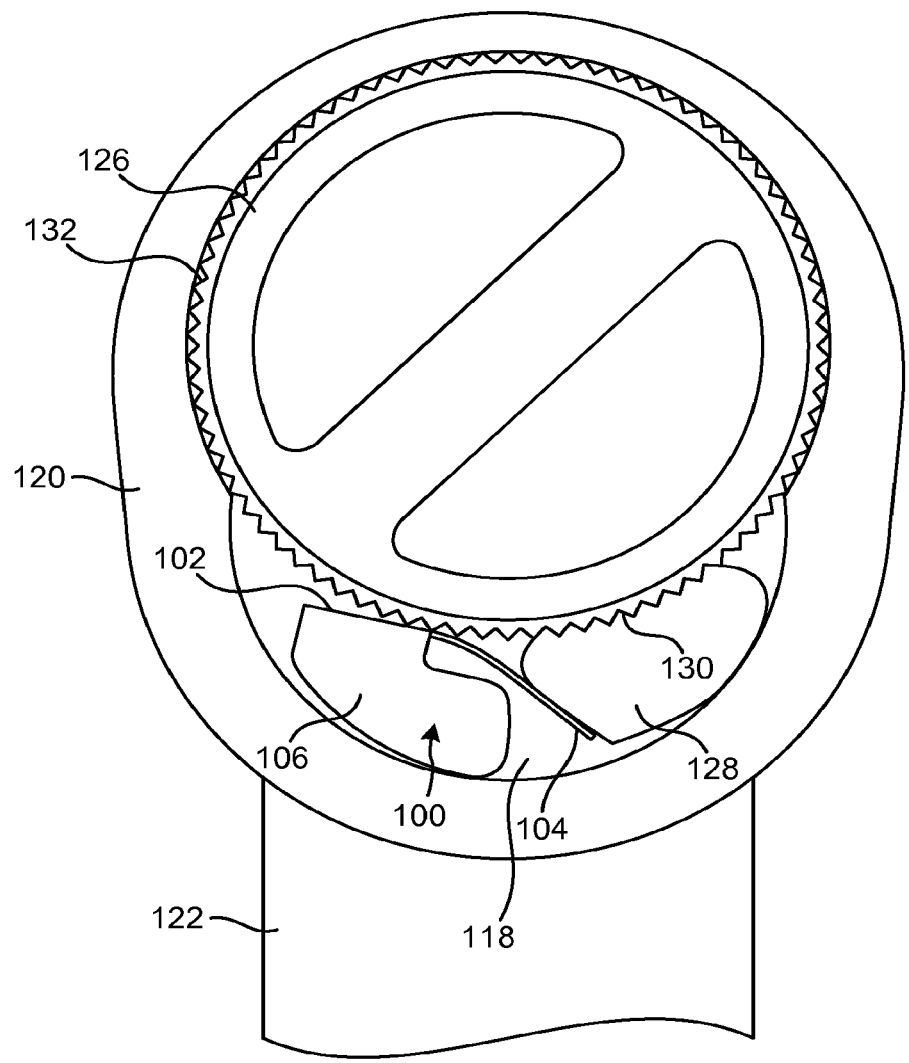
FIG. 6 is a top plan view of the ratchet mechanism of FIG. 5, partially assembled.

In an embodiment, a spring component 100 for a ratcheting mechanism, such as, for example, located in a ratchet wrench, is described with reference to FIGS. 1-4. The spring component 100 is elastic and includes a base portion 102, a leaf 104, a first support arm 106, and a second support arm 108. In an undistorted position (e.g., no force applied to cause elastic deformation), the leaf 104 extends from the base portion 102 in a first direction in a same plane as the base portion 102. In a distorted configuration (e.g., a force is applied to cause elastic deformation), as shown in FIG. 6, the leaf 104 and base portion 102 can be disposed at an angle relative to each other. The angle can be larger (i.e., more flat) when the pawl is engaged with the drive gear, and smaller (i.e., more angled) when the pawl disengages and slips against the drive gear. The leaf 104 can also include a leaf width W1 that is less than a base width W2 of the base portion 102, as illustrated in FIG. 2.

The first support arm 106 extends from a first side of the base portion 102, and extends in a second direction substantially perpendicular to the plane of the base portion 102. Similarly, the second support arm 108 extends from a second side of the base portion 102, opposite the first side, and extends in the second direction substantially perpendicular to the plane of the base portion 102. The first and second support arms 106, 108 also extend in a direction parallel to the first direction forming respective spaces or gaps 110, 112 respectively between the first and second support arms 106 and 108 and the bias prong 104. These gaps 110, 112 allow the leaf 104 to flex and apply the requisite amount of bias against a pawl, without the leaf 104 contacting the support arms 106, 108 when flexed.

The first and second support arms 106, 108 respectively include arcuate edges 114, 116 distal to the leaf 104 to allow the spring component 100 to abut a sidewall of a recess in the tool, as described in further detail below. As shown, the edges 114, 116 can be arcuate to allow a smooth rocking movement of the spring component 100 during use.

Figure 5:
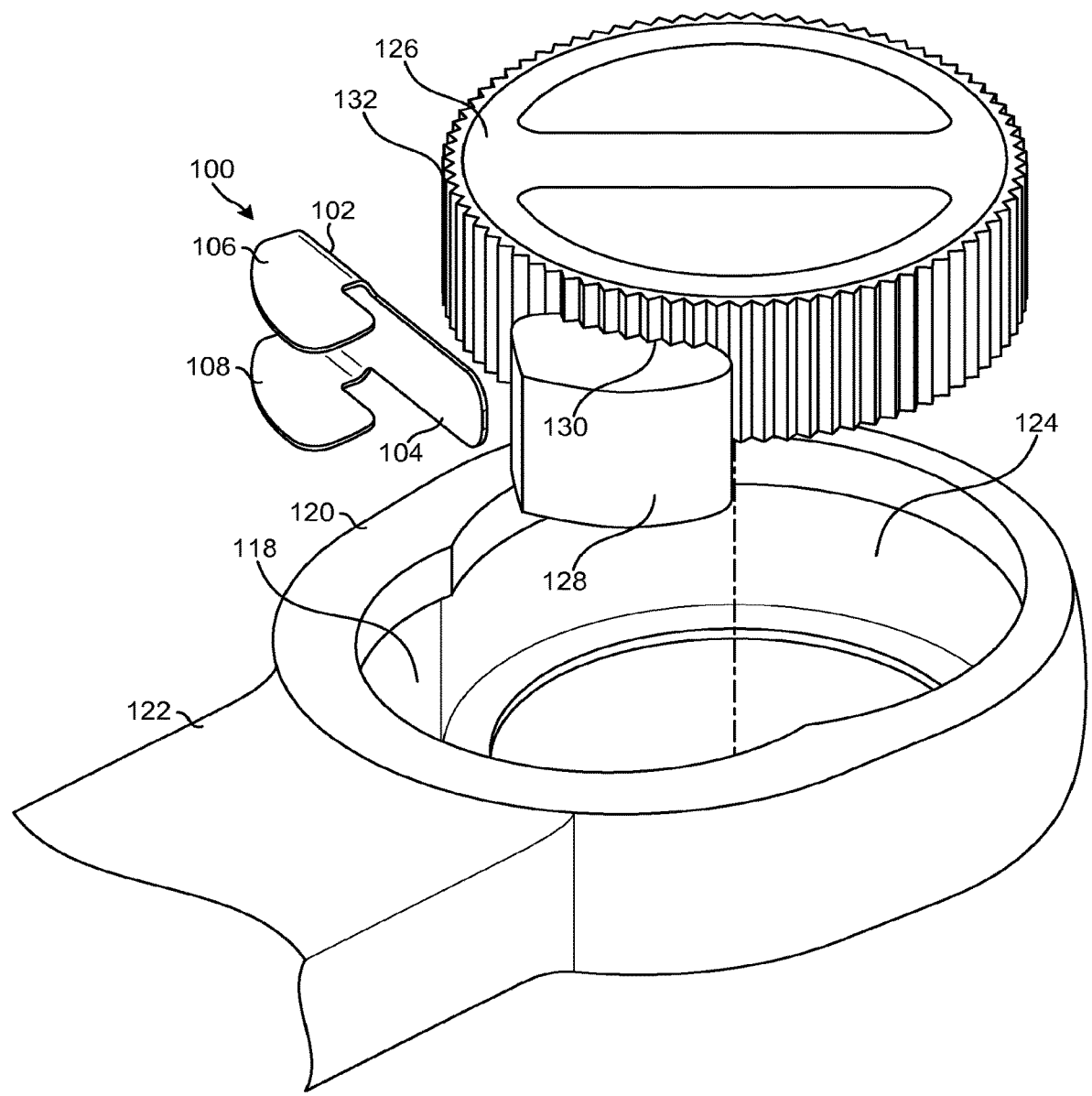
FIG. 5 is an exploded perspective view of a ratchet mechanism according to an embodiment of the present invention.

Referring to FIGS. 5 and 6, the spring component 100 can be shaped to fit within a recess 118 in a head 120 of a tool 122, such as, for example, a ratchet wrench. For example, the ratchet wrench 122 may include the head 120, the recess 118 in the head 120, and an opening 124 in the head 120 in communication with the recess 118. A drive gear 126 can be disposed in the opening 124, and a pawl 128 can be disposed in the recess 118. The pawl 128 can be movably engagable with the drive gear 126 to engage the drive gear 126 in the drive direction, but slips against or otherwise disengages the drive gear 126 in a ratcheting direction opposite the drive direction.

The spring component 100 can be disposed in the recess 118 between the drive gear 126 and a sidewall of the recess 118. For example, the spring component 100 can abut the drive gear 126 at the base portion, abut the pawl 128 at the leaf 104, and abut the sidewall of the recess 118 at the edges 114, 116 opposite the leaf 104. The bias force from the leaf 104 can cause pawl teeth 130 of the pawl 128 to engage gear teeth 132 of the drive gear 126. This engagement enables the ratchet wrench 122 to apply torque when rotated in a drive direction.

The spring component 100 also allows for slipping or ratcheting when rotated in a ratcheting direction opposite the drive direction. For example, when the ratchet wrench 122 is rotated in the ratchet direction, the leaf 104 allows the pawl 128 to shift against the bias force and out of engagement with the ratchet gear 126. In this manner, the leaf 104 may elastically flex or bend to allow the pawl 128 to shift out of engagement with the ratchet gear 126 and allow for slipping or ratcheting when the ratchet wrench 122 rotated in the ratcheting direction. When rotated back in the drive direction, however, the leaf 104 returns to its normal state and applies a bias force to the pawl 128 to re-engage the drive gear 126 and allow the ratchet wrench 122 to apply torque to a work piece.

The shape of the spring component 100 independently retains the spring component 100 in the recess 118. The spring component 100 does not require any special machining or additional component to position and retain the spring component 100 in the recess 118. Rather, the spring component 100 can be independently retained within the recess 118 by frictionally abutting the pawl 128 with the leaf 104, by frictionally abutting the drive gear 126 with the base portion 102, and by frictionally abutting a sidewall of the recess 118 with the support arms 106, 108, for example, at the edges 114, 116.

It will also be appreciated that the tool 122 may include a drive lug extending from the drive gear 126 for mating with a socket type adaptor, or a recess disposed in the drive gear 126. The socket type adaptor and/or recess may be adapted to engage a work piece for providing torque to the working piece, such as a head of a fastener or other tool.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The manner set forth in the foregoing description and accompanying drawings and examples, is offered by way of illustration only and not as a limitation. More particular embodiments have been shown and described, and it should be apparent to those skilled in the art that changes and modifications may be made without departing from the broader aspects of the disclosure. The actual scope of the protection sought is intended to be defined in the following claims when viewed in their proper prospective based on the prior art.

What is claimed is:

1. A bias component for a ratchet mechanism, the bias component comprising:
   a base portion extending in a first plane;
   a pliable leaf portion extending from the base portion in a first direction and adapted to be elastically disposable between distorted and undistorted positions, wherein the leaf portion extends in the first plane when the leaf portion is in the undistorted position; and
   a support arm integrally formed with and extending from the base portion to an arcuate edge, wherein the support arm extends in a second plane substantially perpendicular to the first plane and has a portion that protrudes in a second direction parallel to the first direction to form a gap between the leaf portion and the support arm.

2. The bias component of claim 1, wherein the base portion has a base width and the leaf portion has a leaf width, and wherein the base width is larger than the leaf width.

3. A bias component for a ratchet mechanism, the bias component comprising:
- a base portion extending in a first plane;
- a pliable leaf portion extending from the base portion in a first direction and adapted to be elastically disposable between distorted and undistorted positions, wherein the leaf portion extends in the first plane when the leaf portion is in the undistorted position;
- a first support arm integrally formed with and extending from a first side of the base portion to a first arcuate edge, wherein the first support arm extends in a second plane substantially perpendicular to the first plane and has a portion that protrudes in a second direction parallel to the first direction to form a first gap between the leaf portion and the first support arm; and
- a second support arm integrally formed with and extending from a second side of the base portion opposite the first side to a second arcuate edge.

4. The spring component of claim 3, wherein the base portion has a base width and the leaf portion has a leaf width, wherein the base width is larger than the leaf width.

5. The spring component of claim 3, further comprising a second gap disposed between the leaf portion and the second support arm.

6. The spring component of claim 3, wherein when disposed in the distorted position, the leaf portion is disposed at a first angle with respect to the base portion and is adapted to bias a pawl into engagement with a ratchet gear.

* * * * *